(12) United States Patent
Singh et al.

(10) Patent No.: US 9,367,120 B2
(45) Date of Patent: Jun. 14, 2016

(54) ELECTRONIC DEVICE AND METHOD OF DETECTING TOUCHES ON A TOUCH-SENSITIVE DISPLAY

(75) Inventors: Amit Pal Singh, Waterloo (CA); James Alexander Robinson, Elmira (CA); John Edward Dolson, Carp (CA); Jeffery John Paul Dippel, Waterloo (CA); Michael Lorne Purdy, Kitchener (CA)

(73) Assignee: BlackBerry Limited, Waterloo (CA)

( * ) Notice: Subject to any disclaimer, the term of this patent is extended or adjusted under 35 U.S.C. 154(b) by 392 days.

(21) Appl. No.: 13/464,805

(22) Filed: May 4, 2012

(65) Prior Publication Data

US 2013/0293484 A1 Nov. 7, 2013

(51) Int. Cl.
*G06F 1/32* (2006.01)
*G06F 3/041* (2006.01)

(52) U.S. Cl.
CPC .......... *G06F 1/3262* (2013.01); *G06F 3/0416* (2013.01)

(58) Field of Classification Search
CPC .......... G06F 2203/04107; G06F 3/044; G06F 1/3262; G06F 3/0416
USPC ................ 345/156–174; 178/18.06
See application file for complete search history.

(56) References Cited

U.S. PATENT DOCUMENTS

| | | |
|---|---|---|
| 7,911,456 B2 | 3/2011 | Gillespie et al. |
| 7,986,313 B2 | 7/2011 | Krah |
| 2006/0284857 A1 | 12/2006 | Oh |
| 2009/0189867 A1 | 7/2009 | Krah et al. |
| 2009/0273573 A1 | 11/2009 | Hotelling |
| 2010/0245286 A1 | 9/2010 | Parker |
| 2010/0245289 A1 | 9/2010 | Svajda |
| 2011/0025619 A1 | 2/2011 | Joguet et al. |
| 2011/0050618 A1* | 3/2011 | Murphy ................ G06F 1/3215 345/174 |
| 2011/0080367 A1 | 4/2011 | Marchand et al. |
| 2011/0157068 A1 | 6/2011 | Parker et al. |
| 2011/0163992 A1* | 7/2011 | Cordeiro et al. ............ 345/174 |
| 2011/0175895 A1 | 7/2011 | Hayakawa et al. |
| 2011/0210941 A1 | 9/2011 | Reynolds et al. |
| 2011/0242100 A1 | 10/2011 | Yamazaki et al. |
| 2011/0285675 A1 | 11/2011 | Amano et al. |
| 2011/0291986 A1 | 12/2011 | Rebeschi et al. |

(Continued)

FOREIGN PATENT DOCUMENTS

EP 2434368 A1 3/2012

OTHER PUBLICATIONS

Extended European Search Report dated Aug. 23, 2012 issued in respect of corresponding European Patent Application No. 12166813.1.

(Continued)

*Primary Examiner* — Olga Merkoulova
*Assistant Examiner* — Ibrahim Khan
(74) *Attorney, Agent, or Firm* — Borden Ladner Gervais LLP; Geoffrey Dekleine

(57) ABSTRACT

A method includes applying a first plurality of pulses to scanning electrodes during a first scan to detect touches on a touch-sensitive display, receiving an indication to scan in a reduced power condition, and when in the reduced power condition, applying a second plurality of pulses to scanning electrodes during a second scan to detect touches on the touch-sensitive display, wherein the second plurality of pulses comprises fewer pulses than the first plurality of pulses.

14 Claims, 4 Drawing Sheets

(56) References Cited

U.S. PATENT DOCUMENTS

2012/0105357 A1* 5/2012 Li ............................ G06F 3/044
  345/174
2013/0027323 A1* 1/2013 Chang ................... G06F 1/3262
  345/173
2013/0194235 A1* 8/2013 Zanone ................. G06F 3/0418
  345/175

OTHER PUBLICATIONS

Office Action dated Sep. 28, 2015, issued on corresponding EP patent application No. 12166813.1.

* cited by examiner

ELECTRONIC DEVICE AND METHOD OF DETECTING TOUCHES ON A TOUCH-SENSITIVE DISPLAY

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and may have limited space for user input and output. The information displayed on the display may be modified depending on the functions and operations being performed.

Improvements in electronic devices with touch-sensitive displays are desirable.

DETAILED DESCRIPTION

Figure 1:
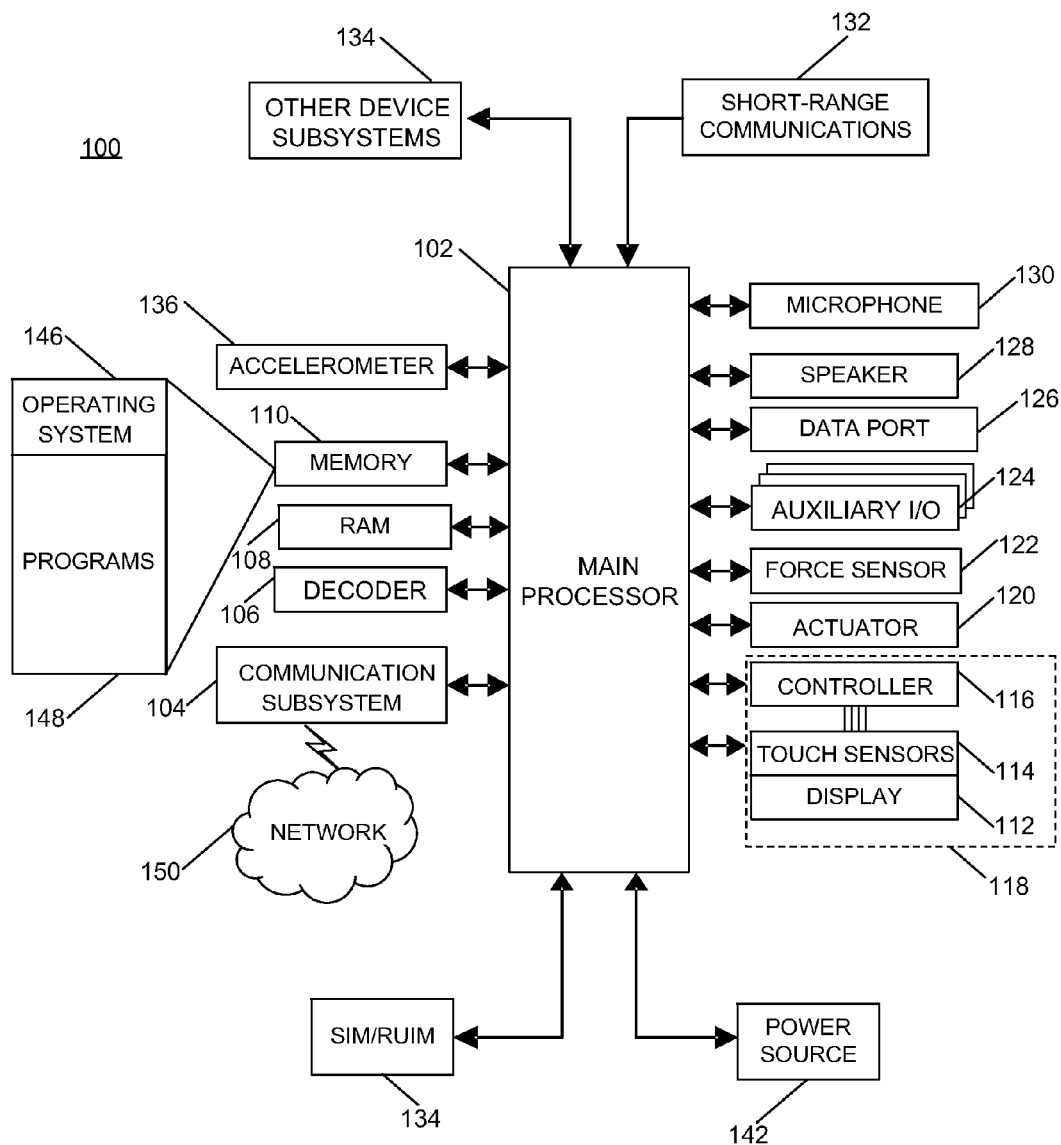
FIG. 1 is a block diagram of a portable electronic device in accordance with the disclosure.

The following describes an electronic device and a method including applying a first plurality of pulses to scanning electrodes during a first scan to detect touches on a touch-sensitive display, receiving an indication to scan in a reduced power condition, and when in the reduced power condition, applying a second plurality of pulses to scanning electrodes during a second scan to detect touches on the touch-sensitive display, wherein the second plurality of pulses comprises fewer pulses than the first plurality of pulses.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device as described herein. Examples of electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may also be a portable electronic device without wireless communication capabilities, such as a handheld electronic game device, digital photograph album, digital camera, media player, e-book reader, and so forth.

A block diagram of an example of a portable electronic device 100 is shown in FIG. 1. The portable electronic device 100 includes multiple components, such as a processor 102 that controls the overall operation of the portable electronic device 100. Communication functions, including data and voice communications, are performed through a communication subsystem 104. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as a Random Access Memory (RAM) 108, memory 110, a touch-sensitive display 118, one or more actuators 120, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the portable electronic device 100 may utilize a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs, applications, or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth. A capacitive touch-sensitive display includes one or more capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensor 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification, including the claims, refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
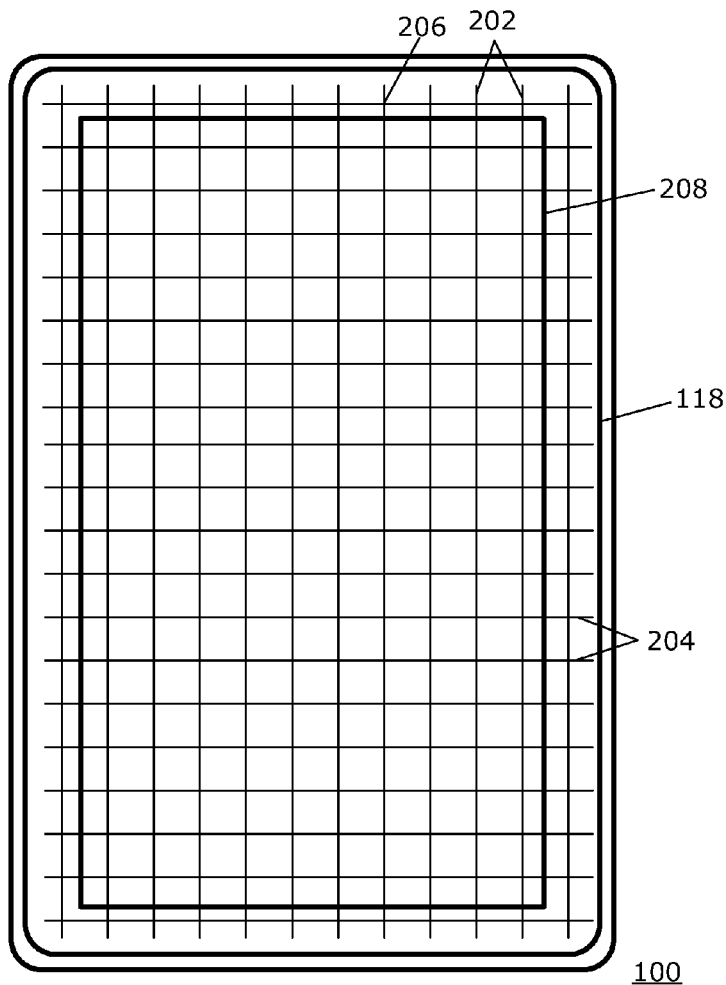
FIG. 2 is a front view of an electronic device in accordance with the disclosure.

A front view of an example of the electronic device 100 is shown in FIG. 2. The electronic device 100 includes the touch-sensitive display 118. The touch-sensitive display 118 may be a capacitive touch-sensitive display that includes capacitive touch sensors. The touch sensors include, for example, drive electrodes, also referred to as scanning electrodes, and sense electrodes. The electrodes 202 and the electrodes 204 may comprise any suitable material, such as indium tin oxide (ITO). The electrodes 202 and the electrodes 204 are not visible when viewing the electronic device 100 but are illustrated in FIG. 2 for the purpose of the present description. In the example illustrated in FIG. 2, the vertical electrodes 202 may be the drive electrodes and the horizontal electrodes 204 may be the sense electrodes. Alternatively, the horizontal electrodes 204 may be the drive electrodes and the vertical electrodes 202 may be the sense electrodes.

The touch-sensitive display 118 includes a display area in which information may be displayed, and a non-display area extending around the periphery of the display area. The display area may include the area inside the rectangle 208 in FIG. 2 and the non-display area may include a surrounding area. Information is typically not displayed in the non-display area, which area is utilized to accommodate, for example, electronic traces or electrical connections, adhesives or other sealants, and/or protective coatings around the edges of the display area. The electrodes 202 and the electrodes 206 may be disposed in the non-display area or may extend from the display area into the non-display area.

In this example, the drive electrodes 202 and the sense electrodes 204 are coupled to the touch controller 116, for example, via a flex connector. The drive electrodes 202 are driven by the touch controller 116 such that pulses of signal are carried by the drive electrodes 202. The signal may be, for example, current or applied voltage. The sense electrodes 204 are utilized to detect changes in the signal at the nodes 206, which are the locations at which the sense electrodes 204 cross over the drive electrodes 202. To determine a touch location, the touch-sensitive display 118 is scanned by driving the drive electrodes 202 while signals from sense electrodes 204 are received at the touch controller 116. Each scan of the touch-sensitive display 118 includes multiple frames. In each frame, a drive electrode 202 is driven utilizing multiple pulses, while receiving signals from a sense electrode 204. Each drive electrode 204 may be driven in multiple frames while sensing utilizing each of the sense electrodes 204.

Figure 3:
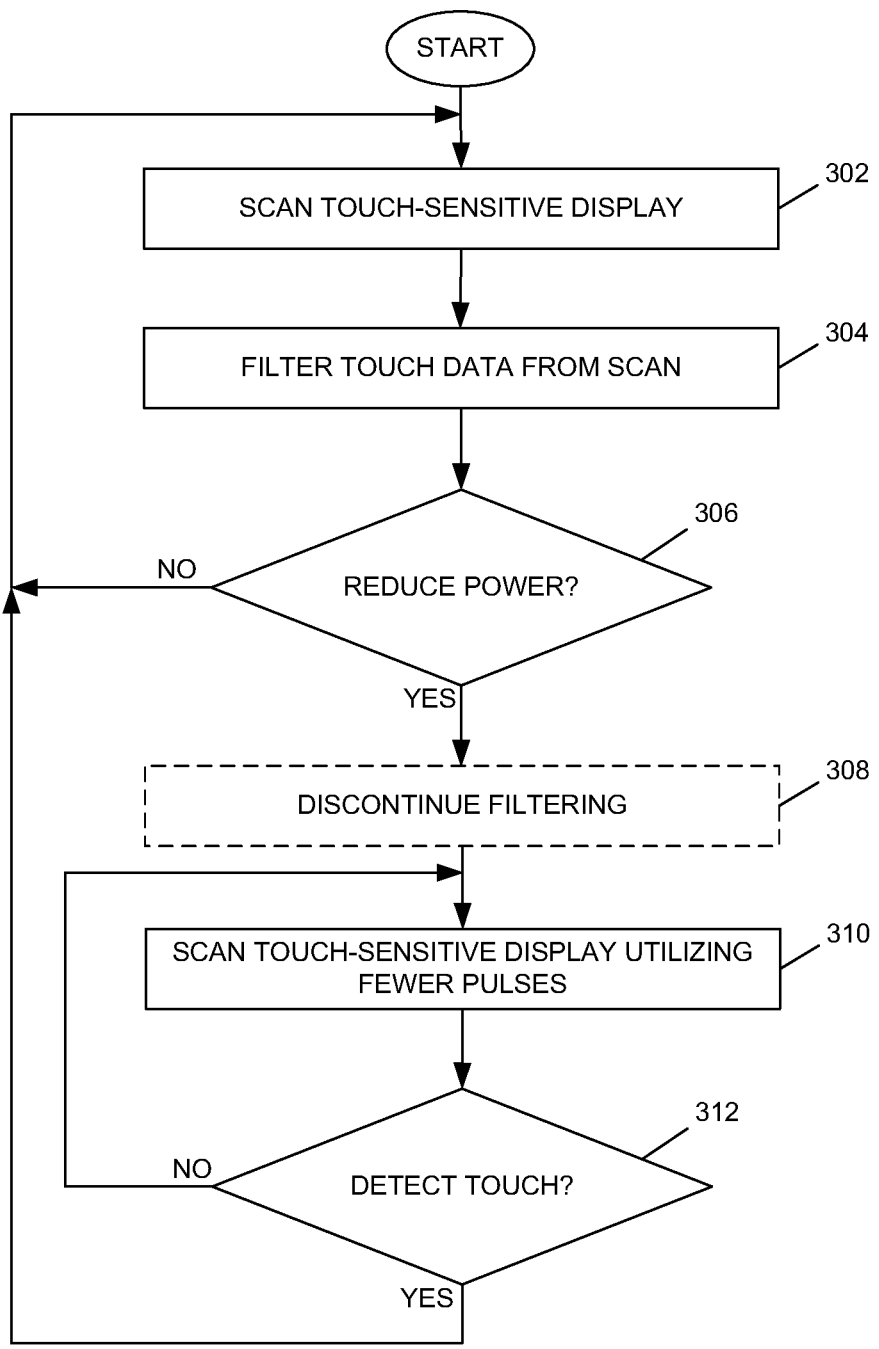
FIG. 3 is a flowchart illustrating an example of a method of detecting touches on a touch-sensitive display in accordance with the disclosure.

A flowchart illustrating an example of a method of detecting touches on the touch-sensitive display 118 is shown in FIG. 3. The method may be carried out by software executed, for example, by the touch controller 116. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable storage medium, such as a non-transitory computer-readable storage medium, which medium is tangible.

Figure 4:
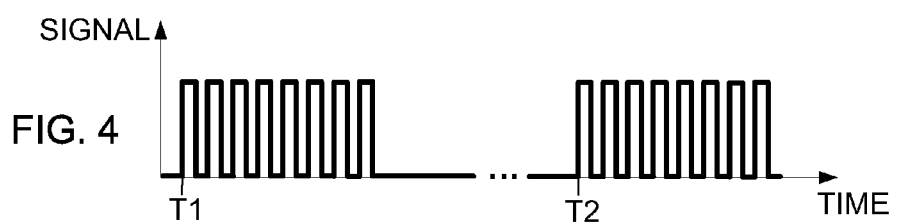
FIG. 4 and FIG. 5 illustrate pulses of a signal utilized to drive a drive electrode during scanning in accordance with the disclosure.

During operation of the portable electronic device 100, the touch-sensitive display is scanned 302 by driving the drive electrodes 202 while signals from the sense electrodes 204 are received at the touch controller 116. During a frame of the scan, one drive electrode 202 is driven by applying multiple pulses of a signal, such as shown in FIG. 4, while sensing utilizing a sense electrode 204. Frames of two scans are illustrated in FIG. 4. The frame start times are separated by a period of time from T1 to T2. Between frames for a given drive electrode 204, other drive electrodes 204 may be driven.

Touch data is received at the controller 116 during scanning of the touch-sensitive display 118 and the touch data may be filtered 304 at the controller 116. For example, the touch data may be compared to touch data previously reported by the controller 116 to the processor 102. When, for example, a touch is detected, and the touch does not move by a threshold distance, the new touch location may not be reported to the processor 102. This filtering is performed to reduce the noise and/or jitter and reduce the data reported to the processor 102. Alternatively, other noise reduction methods may be utilized to improve accuracy of a reported touch. For example, a common mode noise reduction method may be utilized.

When an indication to enter a low-power condition, or reduced power condition, is received 306, for example, from the processor 102, the process continues at 308. The indication may be a command received from the processor. The low-power condition or reduced power condition, which may be referred to as a "sleep" condition or state, is a condition in which no information is displayed on the touch-sensitive display. During a low-power condition, the electronic device 100 may discontinue processes or operate processes at a slower speed and one or more hardware components may be powered-down or operated at a slower speed to conserve power or provide other advantages. The electronic device 100 may operate in the low-power condition when the processor 102 determines that no touch is detected on the touch-sensitive display 118 for a period of time that meets a threshold, when no input is generally detected by the electronic device 100, when the device is locked by selection of a button or receipt of a gesture on the touch-sensitive display 118, or when the device is placed in a holster or covered by a cover, to name a few examples.

Figure 5:
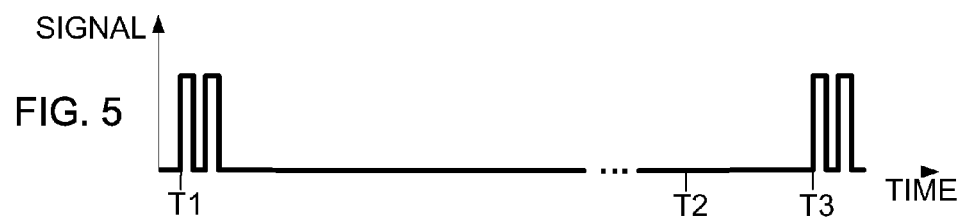

Optionally, the filtering at the controller 116 may be discontinued 308 to reduce the power utilized by the processor to perform the filtering. The touch-sensitive display is scanned 310 by applying fewer pulses to the drive electrodes than the number of pulses utilized in a normal or full-power condition. During a frame of the scan, a drive electrode 204 is driven by applying fewer pulses of current/voltage while sensing utilizing a sense electrode 204. For example, a drive electrode 204 may be driven utilizing half the number of pulses utilized to drive the electrode 204 during scanning at 302. Power is conserved by driving the scan electrodes utilizing fewer pulses than the number of pulses utilized in a full-power condition, such as shown in FIG. 5. Fewer pulses are applied to each scanning electrode during a scan when the electronic device 100 is in the low-power condition than the number of pulses applied to each scanning electrode during a scan when the electronic device is in the full-power condition. A touch on the touch-sensitive display 118 is detectable when the scanning electrodes are driven utilizing fewer pulses. Fewer pulses may result in reduced touch location accuracy.

When a touch on the touch-sensitive display is detected 312, the process continues at 302. The drive electrodes 204 are again driven utilizing a greater number of pulses during scanning in response to detecting the touch.

Thus, the portable electronic device 100 may utilize less power by applying fewer pulses to the drive electrodes 204 to detect a touch. When a touch is detected, the location may be accurately and reliably determined by resuming scanning by applying a greater number of pulses to the drive electrodes 204. By reducing the number of pulses applied to the drive electrodes 204, touches on the touch-sensitive display are still detected and the chance of not detecting a touch or missing the touch is low.

An example of multiple pulses of a signal utilized to drive a drive electrode 202 in one frame of a scan is illustrated in FIG. 4. In this example, the frame includes 8 pulses that are utilized to drive a drive electrode 202. Eight pulses, which may be square-wave pulses, may be utilized when the electronic device is operating in a full-power condition. A drive electrode 202 may be driven with eight pulses in a frame of a scan. A different drive electrode 202 is driven in each successive frame of the scan.

Another example of multiple pulses of a signal utilized to drive a drive electrode 202 in one frame of a scan is illustrated in FIG. 5. In this example, 2 pulses are utilized to drive the drive electrode 202 in one frame of a scan when the portable electronic device 100 is operating in the low-power condition. 2 pulses are utilized to drive an electrode in a frame of a scan, rather than 8 pulses, to conserve power while detecting a touch. Each of the drive electrodes 202 may be driven with 2 pulses in a frame of a scan. The time during which the drive electrodes 202 are driven when the portable electronic device 100 is operating in the low-power condition is much less than the time during which the drive electrodes 202 are driven when in the full-power condition. Thus, the total time of one scan when operating in the low-power condition is much less than the total time of one scan when operating in the full-power condition. The sleep time, which is the time between scans, is increased when in the low-power condition compared to the full-power condition. The number of pulses may be reduced from the number utilized when in the full-power condition to any number. The pulses may be spread apart in time such that the time between pulses may be increased when in the low-power condition compared to the time between pulses when in the full-power condition. For example, the scans in the low-power condition may be separated by a time from T1 to T3, where T3 is further out in time than T2.

Figure 6:
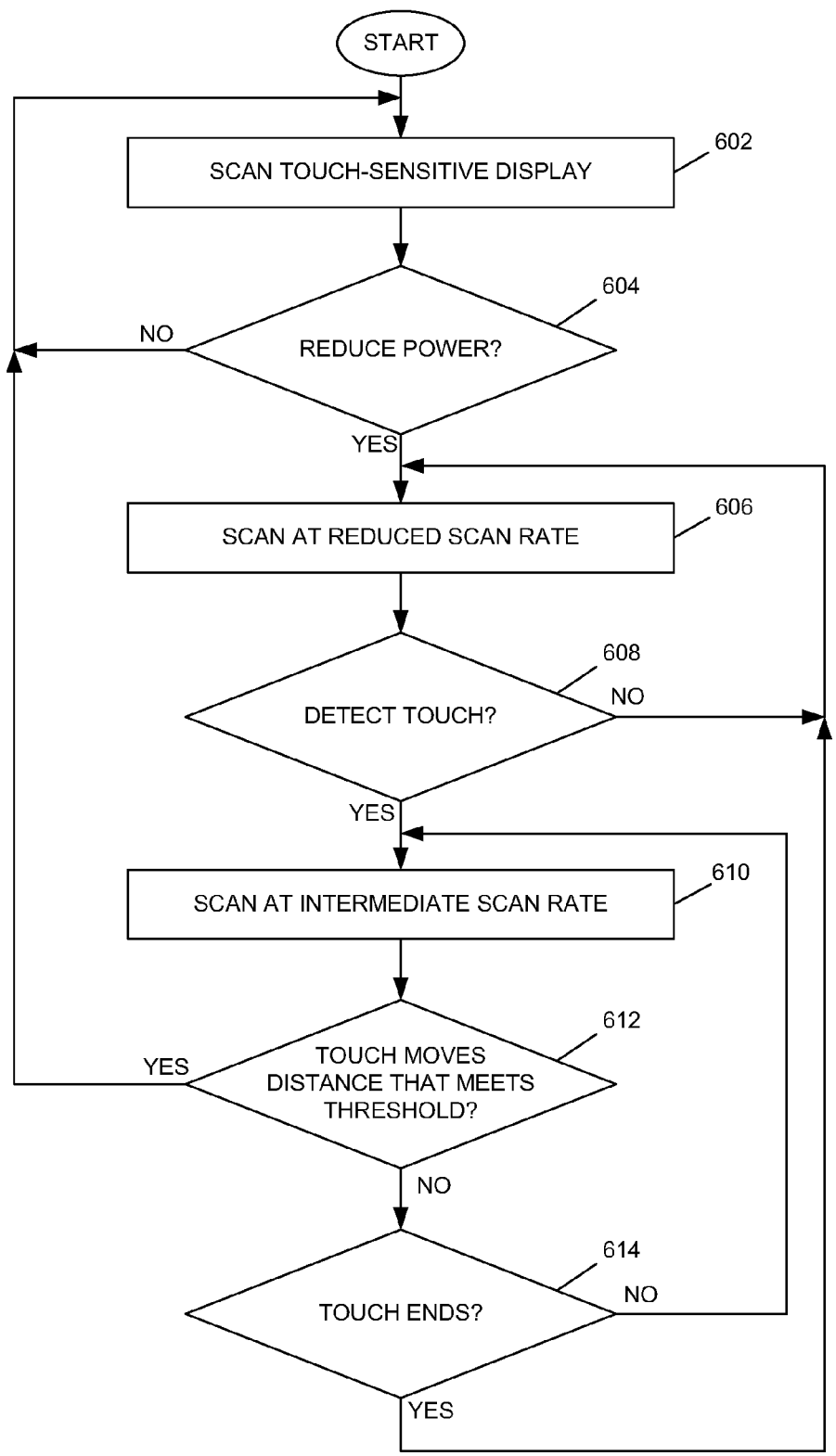
FIG. 6 is a flowchart illustrating an example of a method of detecting touches on a touch-sensitive display in accordance with the disclosure.

A flowchart illustrating another example of a method of detecting touches on the touch-sensitive display 118 is shown in FIG. 6. The method may be carried out by software executed, for example, by the touch controller 116. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable medium.

The touch-sensitive display 118 is scanned 602 at regular intervals in time to detect touches and to detect movement of touches on the touch-sensitive display 118. The touch-sensitive display 118 is scanned by driving the drive electrodes 202 while signals from sense electrodes 204 are received at the touch controller 116. Each scan of the touch-sensitive display 118 includes multiple frames in which a drive electrode 202 is driven while receiving signals from a sense electrode 204. Information may also be displayed on the touch-sensitive display 118.

When an indication to enter a low-power condition is received 604, for example, from the processor 102, the process continues at 606. The indication may be a command received from the processor 102 when the processor 102 determines that no touch is detected on the touch-sensitive display 118 for a period of time that meets a threshold, when no input is generally detected by the electronic device 100, when the device is locked by selection of a button or receipt of a gesture on the touch-sensitive display 118, or when the device is placed in a holster or covered by a cover, to name a few examples.

The touch-sensitive display 118 is scanned 606 at a reduced scanning rate by increasing the period of time between scans of the touch-sensitive display 118. The scans may be carried out at regular intervals in time and the time during which scans are not performed is increased. Power consumption is reduced by scanning the touch-sensitive display 118 less frequently. Display of information may also be discontinued.

The touch-sensitive display 118 is scanned less frequently until, for example, a touch is detected on the touch-sensitive display 118. In response to detecting 608 a touch on the touch-sensitive display 118, the process continues at 610 and the touch-sensitive display 118 is scanned 610 at an intermediate scanning rate. The intermediate scanning rate is a scanning rate that is between scanning rate when the electronic device 100 operates in the full-power condition, referred to as the full-power scanning rate, and the scanning rate when the electronic device 100 operates in the low-power condition at 606, referred to as the low-power scanning rate. The scanning rate is increased to the intermediate scanning rate by decreasing the time between scans such that the time between scans is greater than the time between scans at 602 and less than the time between scans at 606. For example, the time between scans may be an average of the time between scans at 602 and the time between scans at 606.

When the touch moves a distance that meets a threshold at 612, the process continues at 602 and the touch-sensitive display 118 is again scanned at the full-power scanning rate. Thus, the distance between the detected touch location and the original touch location for that touch is determined. When the distance meets a threshold distance, the scanning resumes at 602. A value may meet a threshold when the value is equal to or exceeds the threshold.

When the touch does not move a distance that meets the threshold, the process continues at 614. When the touch ends 614, the process continues at 606 and the touch-sensitive display 118 is again scanned at the low-power scanning rate. When the touch does not end at 614, scanning continues at the intermediate scanning rate.

The method of detecting touches described with reference to FIG. 4 may be performed separate from or with the method described with reference to FIG. 3. For example, when the electronic device 100 enters the low-power condition at 306, the scanning at 310 may also be performed at a reduced scanning rate by increasing the period of time between scans of the touch-sensitive display 118. In response to detecting a touch on the touch-sensitive display 118, the touch-sensitive display 118 may be scanned at the intermediate scanning rate. When the touch moves a distance that meets a threshold, the touch-sensitive display 118 is again scanned at the full-power scanning rate.

A method includes applying a first plurality of pulses to scanning electrodes during a first scan to detect touches on a touch-sensitive display, receiving an indication to scan in a reduced power condition, and when in the reduced power condition, applying a second plurality of pulses to scanning electrodes during a second scan to detect touches on the touch-sensitive display, wherein the second plurality of pulses comprises fewer pulses than the first plurality of pulses. An electronic device includes a touch-sensitive display comprising scanning electrodes, sense electrodes, and at least one controller coupled to the scanning electrodes and the sense electrodes, and configured to apply a first plurality of pulses to the scanning electrodes during a first scan to detect touches on the touch-sensitive display, receive an indication to scan in a reduced power condition, and, when in the reduced power condition, apply a second plurality of pulses to scanning electrodes during a second scan to detect touches on the touch-sensitive display, wherein the second plurality of pulses comprises fewer pulses than the first plurality of pulses. A method includes scanning a touch-sensitive display at a first scanning rate to detect touches on the touch-sensitive display, scanning the touch-sensitive display at a second scanning rate that is less than the first scanning rate to detect touches in a reduced power condition, and in response to detecting a touch when scanning at the second scanning rate, scanning the touch-sensitive display at a third scanning rate, wherein the third scanning rate is between the first scanning rate and the second scanning rate.

Power consumption is reduced when scanning at the low power scanning rate. Power consumption is increased when a touch is detected such that movement of the touch is detectable. Power consumption is not increased to full power until the touch moves at least a threshold distance. Thus, a gesture on the touch-sensitive display 118 may be utilized to again display information and resume scanning of the touch-sensitive display 118 at the full power scanning rate. Touches, such as inadvertent touches, that do not move the threshold distance on the touch-sensitive display 118 do not cause the touch-sensitive display 118 to return to full power scanning.

The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   scanning a touch-sensitive display in a plurality of first frames to detect touches on the touch-sensitive display in a full-power operating condition by, during each of the plurality of first frames, driving a respective one of the drive electrodes by applying a first plurality of pulses to the respective one of the drive electrodes while sensing utilizing the sense electrodes;
   receiving an indication to scan in a reduced power condition; and
   when in the reduced power condition, scanning the touch-sensitive display in a plurality of second frames to detect touches on the touch-sensitive display by, during each of the plurality of second frames, driving the respective one of the drive electrodes by applying a second plurality of pulses to the respective one of the drive electrodes while sensing utilizing the sense electrodes;
   wherein the second plurality of pulses comprises fewer pulses than the first plurality of pulses such that fewer pulses are applied to each drive electrode when in the reduced power condition than when in the full-power operating condition, wherein the time during which the pulses are applied in one frame when in the reduced power condition is less than the time during which the pulses are applied in one frame when in the full-power operating condition and the pulses applied in one frame when in the reduced power condition are spread apart such that a time between pulses applied in one frame when in the reduced power condition is increased compared to the time between pulses applied in one frame when in the full-power operating condition, and wherein a sleep time between scans of the touch-sensitive display is greater when in the reduced power condition compared to the time between scans of the touch-sensitive display when in the full-power operating condition.

2. The method according to claim 1, wherein applying the first plurality of pulses comprises applying pulses to a first drive electrode during a first scan, and wherein applying a second plurality of pulses comprises applying fewer pulses to the first drive electrode during a second scan.

3. The method according to claim 1, comprising, in response to detecting a touch when in the reduced power condition, scanning the touch-sensitive display in a plurality of third frames to detect touches on the touch-sensitive display by, during each of the plurality of third frames, driving the respective one of the drive electrodes by applying a third plurality of pulses to the respective one of the drive electrodes while sensing utilizing the sense electrodes.

4. The method according to claim 1, wherein receiving an indication comprises receiving, from a processor, a command to enter the reduced power condition.

5. The method according to claim 1, comprising filtering data received from sense electrodes during scanning in the full-power operating condition by:
  comparing the data to previous touch data which was previously reported by a touch controller to a processor; and
  reporting the data received from the sense electrodes, by the touch controller to the processor only when a touch location associated with the data received from the sense electrodes differs from a previous touch location associated with the previous touch data by a threshold distance, and
discontinuing filtering when in the reduced power condition.

6. The method according to claim 1, wherein scanning is performed at a first scanning rate when in the full-power operating condition, scanning is performed at a second scanning rate when in the reduced power operating condition, scanning is performed at a third scanning rate in response to detecting a touch on the touch-sensitive display when in the reduced power operating condition, and wherein the third scanning rate is between the first scanning rate and the second scanning rate.

7. An electronic device comprising:
  a touch-sensitive display comprising:
    drive electrodes;
    sense electrodes; and
    at least one controller coupled to the scanning electrodes and the sense electrodes and configured to:
      perform a first scan of the touch-sensitive display in a plurality of first frames to detect touches on the touch-sensitive display in a full-power operating condition by, during each of the plurality of first frames, driving a respective one of the drive electrodes by applying a first plurality of pulses to the respective one of the drive electrodes;
      receive an indication to scan in a reduced power condition;
      when in the reduced power condition, perform a second scan of the touch-sensitive display in a plurality of second frames to detect touches on the touch-sensitive display by, during each of the plurality of second frames, driving the respective one of the drive electrodes by applying a second plurality of pulses to the respective one of the drive electrodes, wherein the second plurality of pulses comprises fewer pulses than the first plurality of pulses such that fewer pulses are applied to each drive electrode when in the reduced power condition than when in the full-power operating condition, wherein the time during which the pulses are applied in one frame when in the reduced power condition is less than the time during which the pulses are applied in one frame when in the full-power operating condition and the pulses applied in one frame when in the reduced power condition are spread apart such that a time between pulses applied in one frame when in the reduced power condition is increased compared to the time between pulses applied in one frame when in the full-power operating condition, and
      wherein a sleep time between scans of the touch-sensitive display is greater when in the reduced power condition compared to the time between scans of the touch-sensitive display when in the full-power operating condition.

8. The electronic device according to claim 7, wherein the first plurality of pulses comprises pulses applied to a first drive electrode during the first scan, and wherein the second plurality of pulses comprises fewer pulses applied to the first drive electrode during the second scan.

9. The electronic device according to claim 7, wherein the controller is configured to, in response to detecting a touch when in the reduced power condition, scan the touch-sensitive display in a plurality of third frames to detect touches on the touch-sensitive display by, during each of the plurality of third frames, driving the respective one of the drive electrodes by applying a third plurality of pulses to the respective one of the drive electrodes while sensing utilizing the sense electrodes.

10. The electronic device according to claim 7, wherein the controller is configured to:
  filter data received from sense electrodes during the first scan by:
    comparing the data to previous touch data which was previously reported by the controller to a processor of the electronic device; and
    reporting the data received from the sense electrodes, by the touch controller to the processor, only when a touch location associated with the data received from the sense electrodes differs from a previous touch location associated with the previous touch data by a threshold distance; and
  discontinue filtering when in the reduced power condition.

11. A non-transitory computer-readable storage medium having computer-readable code stored thereon, the computer-readable code executable by at least one of a controller and a processor of the portable electronic device to:
  scanning a touch-sensitive display in a plurality of first frames to detect touches on the touch-sensitive display in a full-power operating condition by, during each of the plurality of first frames, driving a respective one of the drive electrodes by applying a first plurality of pulses to the respective one of the drive electrodes while sensing utilizing the sense electrodes;
  receive an indication to scan in a reduced power condition; and
  when in the reduced power condition, scanning the touch-sensitive display in a plurality of second frames to detect touches on the touch-sensitive display by, during each of the plurality of second frames, driving the respective one of the drive electrodes by applying a second plurality of pulses to the respective one of the drive electrodes while sensing utilizing the sense electrodes;

wherein the second plurality of pulses comprises fewer pulses than the first plurality of pulses such that fewer pulses are applied to each drive electrode when in the reduced power condition than when in the full-power operating condition, wherein the time during which the pulses are applied in one frame when in the reduced power condition is less than the time during which the pulses are applied in one frame when in the full-power operating condition, and the pulses applied in one frame when in the reduced power condition are spread apart such that a time between pulses applied in one frame when in the reduced power condition is increased compared to the time between pulses applied in one frame when in the full-power operating condition, and wherein a sleep time between scans of the touch-sensitive display is greater when in the reduced power condition compared to the time between scans of the touch-sensitive display when in the full-power operating condition.

12. The non-transitory computer-readable storage medium according to claim 11, wherein applying the first plurality of pulses comprises applying pulses to a first drive electrode during a first scan, and wherein applying a second plurality of pulses comprises applying fewer pulses to the first drive electrode during a second scan.

13. The non-transitory computer-readable storage medium according to claim 11, wherein receiving an indication comprises receiving, from a processor, a command to enter the reduced power condition.

14. The non-transitory computer-readable storage medium according to claim 11, wherein scanning is performed at a first scanning rate when in the full-power operating condition, scanning is performed at a second scanning rate when in the reduced power operating condition, scanning is performed at a third scanning rate in response to detecting a touch on the touch-sensitive display when in the reduced power operating condition, and wherein the third scanning rate is between the first scanning rate and the second scanning rate.

* * * * *